(12) United States Patent
Reznik et al.

(10) Patent No.: US 7,916,751 B2
(45) Date of Patent: Mar. 29, 2011

(54) METHOD AND APPARATUS FOR EFFICIENT OPERATION OF AN ENHANCED DEDICATED CHANNEL

(75) Inventors: Alexander Reznik, Titusville, NJ (US); Edward L. Hepler, Malvern, PA (US); Guodong Zhang, Farmingdale, NY (US); Harry Seth Smith, Malvern, PA (US); Jung-Lin Pan, Selden, NY (US); Peter Shaomin Wang, E. Setauket, NY (US); Renuka Racha, Kings Park, NY (US); Robert G. Gazda, Spring City, PA (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 382 days.

(21) Appl. No.: 11/471,402

(22) Filed: Jun. 19, 2006

(65) Prior Publication Data

US 2007/0060142 A1 Mar. 15, 2007

Related U.S. Application Data

(60) Provisional application No. 60/692,473, filed on Jun. 21, 2005.

(51) Int. Cl.
*H04J 3/16* (2006.01)
(52) U.S. Cl. .......... 370/469; 370/336; 370/474; 455/69; 455/450
(58) Field of Classification Search .................. 370/252, 370/241, 464, 310, 319, 320, 322, 277, 328–329, 370/335–338, 394, 465–469, 473–474, 477; 455/500, 522, 509, 24, 69, 126, 450–451
See application file for complete search history.

(56) References Cited

U.S. PATENT DOCUMENTS

| 6,167,031 | A | 12/2000 | Olofsson et al. | |
| 6,473,442 | B1 | 10/2002 | Lundsjo et al. | |
| 6,816,510 | B1 * | 11/2004 | Banerjee | 370/503 |

(Continued)

FOREIGN PATENT DOCUMENTS

EP 1 161 106 12/2001

(Continued)

OTHER PUBLICATIONS

Zte, "Timing of E-HICH and Number of HARQ processes," 3GPP TSG RAN WG1, R1-050056 (Feb. 14-18, 2005).

*Primary Examiner* — Aung S Moe
*Assistant Examiner* — Habte Mered
(74) *Attorney, Agent, or Firm* — Volpe and Koenig, P.C.

(57) ABSTRACT

A method and apparatus for efficient operation of an enhanced dedicated channel (E-DCH) are disclosed. A physical layer processing includes computation of various control parameters followed by actual processing of the data to be transmitted. In accordance with the present invention, the computation of the control parameters is performed asynchronously from the associated data operation. A medium access control (MAC) layer provides information needed for computation of the control parameters to the physical layer as early as possible, while the data is being processed in parallel. The provided data includes a hybrid automatic repeat request (H-ARQ) profile, a transport block size, power offset, or the like. By sending this data to the physical layer before MAC-e processing is complete, the latency constraint can be significantly relaxed.

15 Claims, 3 Drawing Sheets

U.S. PATENT DOCUMENTS

| | | |
|---|---|---|
| 7,039,690 B2 * | 5/2006 | Bullman et al. .............. 709/220 |
| 2002/0021698 A1 | 2/2002 | Lee et al. |
| 2002/0037000 A1 * | 3/2002 | Park et al. ..................... 370/349 |
| 2003/0086391 A1 | 5/2003 | Terry et al. |
| 2003/0202560 A1 | 10/2003 | Tiedemann, Jr. et al. |
| 2005/0185609 A1 * | 8/2005 | Malkamaki ................... 370/328 |
| 2005/0265301 A1 * | 12/2005 | Heo et al. ..................... 370/349 |
| 2006/0067364 A1 * | 3/2006 | Jung et al. .................... 370/469 |
| 2007/0223495 A1 * | 9/2007 | Fukui ....................... 370/395.64 |
| 2008/0159184 A1 * | 7/2008 | Niwano ........................ 370/278 |
| 2008/0276148 A1 * | 11/2008 | Lohr et al. .................... 714/750 |

FOREIGN PATENT DOCUMENTS

WO 2005/050851 6/2005

* cited by examiner

METHOD AND APPARATUS FOR EFFICIENT OPERATION OF AN ENHANCED DEDICATED CHANNEL

CROSS REFERENCE TO RELATED APPLICATION

This application claims the benefit of U.S. provisional application No. 60/692,473 filed Jun. 21, 2005, which is incorporated by reference as if fully set forth.

FIELD OF INVENTION

The present invention is related to a wireless communication system. More particularly, the present invention is related to a method and apparatus for efficient operation of an enhanced dedicated channel (E-DCH).

BACKGROUND

Methods for improving uplink (UL) coverage, throughput and transmission latency are being investigated in Release 6 (R6) of the 3rd generation partnership project (3GPP). In order to successfully implement these methods, scheduling and assigning of UL physical resources have been moved from a radio network controller (RNC) to a Node-B such that the Node-B can make decisions and manage UL radio resources on a short-term basis more efficiently than the RNC, even if the RNC retains overall control over the Node-B.

FIG. 1 is a block diagram of a conventional wireless communication system 100 configured in accordance with the present invention. The system 100 comprises a wireless transmit/receive unit (WTRU) 102, a Node-B 104 and an RNC 106. The RNC 106 controls overall enhanced uplink (EU) operation by configuring EU parameters for the Node-B 104 and the WTRU 102 such as initial transmit power level, maximum allowed EU transmit power or available channel resources per Node-B. Between the WTRU 102 and the Node-B 104, an E-DCH 108, a UL EU signaling channel 110 and a DL EU signaling channel 112 are established for supporting EU operations.

For E-DCH transmissions, the WTRU 102 sends a rate request to the Node-B 104 via the UL EU signaling channel 110. In response, the Node-B 104 sends a rate grant to the WTRU 102 via the DL EU signaling channel 112. After EU radio resources are allocated for the WTRU 102, the WTRU 102 transmits E-DCH data via the E-DCH 108. In response to the E-DCH transmissions, the Node-B 104 sends an acknowledgement (ACK) or non-acknowledgement (NACK) message for hybrid automatic repeat request (H-ARQ) operation via the DL EU signaling channel 112. The Node-B 104 may also respond with rate grants to the WTRU 102 in response to E-DCH data transmissions.

FIG. 2 is a block diagram of conventional protocol architecture of the WTRU 102. The protocol architecture of the WTRU 102 includes higher layers 202, a radio link control (RLC) layer 204, a medium access control (MAC) layer 206 and a physical layer (PHY) 208. The MAC layer 206 includes a dedicated channel MAC (MAC-d) 210 and an E-DCH MAC (MAC-e/es) 212. The MAC-e/es 212 handles all functions related to the transmission and reception of an E-DCH including, but not limited to, H-ARQ transmissions and retransmissions, priority of data, MAC-d/MAC-es multiplexing and transport format combination (TFC) selection.

One or more independent UL transmissions are processed on an E-DCH between a WTRU and a universal mobile telecommunication system (UMTS) terrestrial radio access network (UTRAN) within a common time interval. One example of this would be a MAC layer H-ARQ or a simple MAC layer automatic repeat request (ARQ) operation, where each individual transmission may require a different number of retransmissions to be successfully received by the UTRAN. This operation may result in a loss of transmission sequence at the MAC layer.

In accordance with the 3GPP standards, the transmission time interval (TTI) for the E-DCH is set to either 10 ms or 2 ms. In order to achieve a higher data rate and throughout, the operations of the E-DCH at the WTRU should be carefully designed to accommodate the required timing.

SUMMARY

The present invention is related to a method and apparatus for efficient operation of an E-DCH. Physical layer processing includes computation of various control parameters, (for example, a specific puncturing pattern), followed by actual processing of data to be transmitted. In conventional systems, the operations in the physical layer are commenced only after the MAC processing is complete. In accordance with the present invention, the computation of the control parameters is performed asynchronously from the associated data operation. A MAC layer provides information needed for computation of the control parameters to the physical layer as early as possible, while the data is being processed in parallel. The provided data includes a H-ARQ profile, a transport block size, power offset, or the like. By sending this data to the physical layer before MAC-e processing is complete, the latency constraint can be significantly relaxed.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The present invention provides functional partitioning and interaction between software and hardware entities of E-DCH operations at the WTRU. The present invention is applicable to any type of wireless communication systems including, but not limited to, UMTS frequency division duplex (FDD), time division duplex (TDD) and time division synchronous code division multiple access (TD-SCDMA) systems.

The features of the present invention may be incorporated into an integrated circuit (IC) or be configured in a circuit comprising a multitude of interconnecting components.

Figure 1:
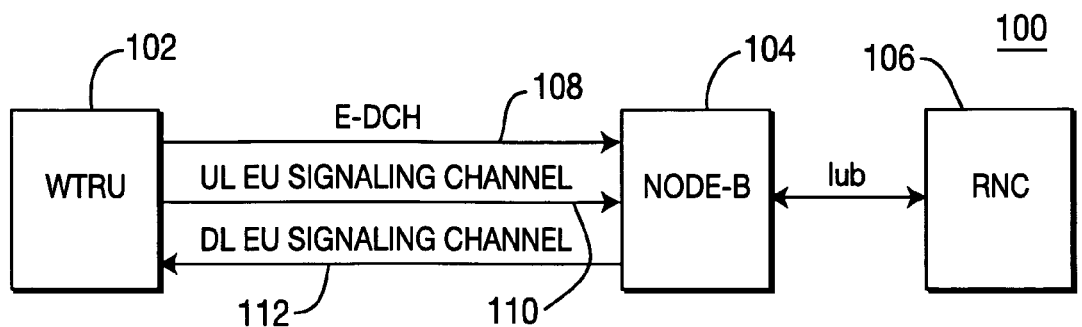
FIG. 1 is a block diagram of a conventional wireless communication system configured in accordance with the present invention.
Figure 2:
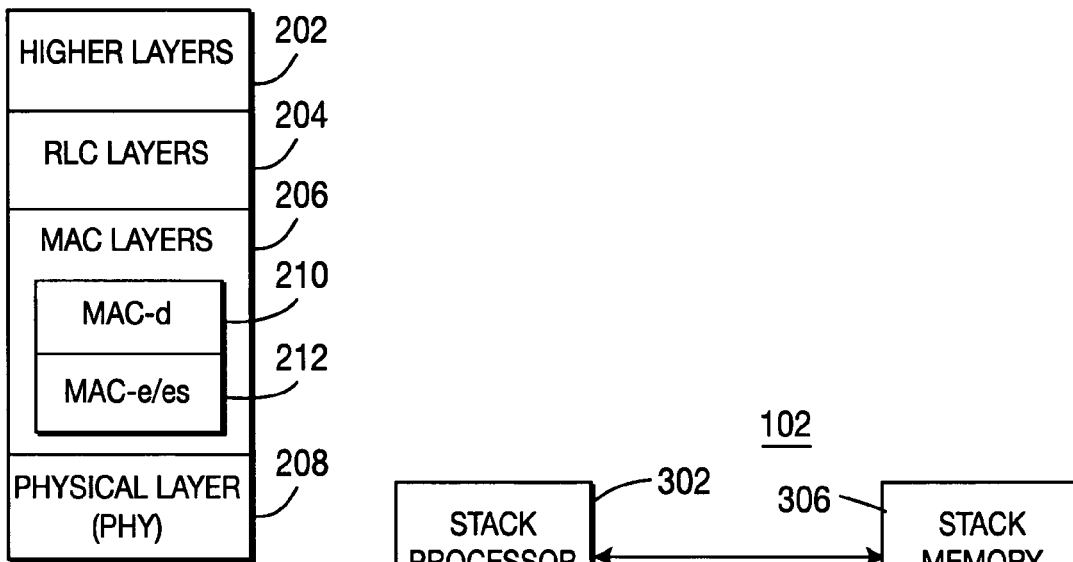
FIG. 2 is a block diagram of conventional protocol architecture of a WTRU utilized in accordance with the present invention.
Figure 3:
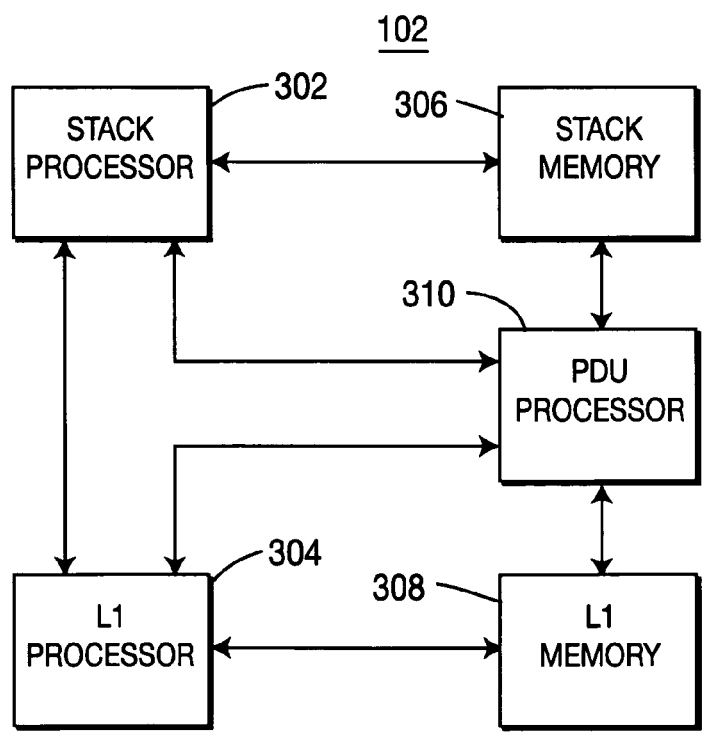
FIG. 3 is a block diagram of a WTRU including the PDU processor in accordance with the present invention.

In accordance with the present invention, a WTRU 102 may include an optional protocol data unit (PDU) processor 310, (i.e., protocol engine), for processing data. FIG. 3 is a block diagram of the WTRU 102 including the PDU processor 310 in accordance with the present invention. The WTRU 102 includes a stack processor 302, an L1 processor 304, a stack memory 306, an L1 memory 308 and a PDU processor 310. The L1 processor 304 primarily executes physical layer software (mostly control processing and potentially some signal processing). The L1 processor 304 may also run certain MAC tasks, such as control related to H-ARQ for high speed downlink packet access (HSDPA) or high speed uplink packet access (HSUPA) and some RLC tasks. The stack processor 302 primarily runs the rest of the protocol stack operations. The stack processor 302 may also be used as an application processor. The stack processor 302 and the L1 processor 304 each have their own memory, (the stack memory 306 and the L1 memory 308, respectively). In a conventional implementation, a significant number of cycles are wasted for re-packaging data as the data is moved through the stack, (e.g., concatenation and separation of PDUs, adding headers, ciphering, or the like).

The PDU processor 310 runs parallel to the stack processor 302 and the L1 processor 304. The PDU processor 310 is a programmable entity used primarily for moving data between L1 memory 308 and the stack memory 306. The PDU processor 310 also performs data packet fragmentation/de-fragmentation, composition/de-composition and ciphering/de-ciphering as it moves the data. Optionally, the PDU processor 310 may also be capable of building and interpreting the RLC and MAC PDU headers.

The PDU processor 310 has specific instructions for manipulating incoming and outgoing bit streams. These instructions reduce the overhead of interpreting bit fields that make up headers or constructing a sequence of bit fields during the generation of headers. The PDU processor 310 builds MAC-e/es PDUs directly from a set of PDU descriptors. The PDU descriptors are a set of shared data structures that describe RLC PDUs and MAC-e/es PDUs, (i.e., contents of data and PDU headers), in a software friendly format, (e.g., byte/word accessible data for fast processing with no bit shifting). The PDU processor 310 builds the MAC-e/es PDU based on the PDU descriptors as the MAC-e/es PDU is written into a physical layer shared memory, (i.e., L1 memory 308), for transmission. The advantage of this scheme is significant reduction of L2/3 processing and parallel processing of protocol stack operation. Frame asynchronous operations are not blocked due to frame synchronous PDU construction processing and L2/3 processing is offloaded to the PDU processor.

It should be noted that FIG. 3 is provided as an example and any variations are possible. For example, a single processor incorporating the L1 processor 304 and the stack processor 302 may be used, and the stack memory 306 and the L1 memory 308 may be the same memory or different memories either on or off the same integrated circuit.

Physical layer processing is typically performed by hardware or mixed hardware/software components. The physical layer processing for HSUPA includes, but is not limited to, turbo encoding, rate matching, interleaving and H-ARQ processing to implement data re-transmission. The physical layer processing includes computation of various control parameters, (for example, a specific puncturing pattern), followed by actual processing of the data. In the prior art, these operations in the physical layer can be commenced only after the MAC-e processing is complete.

In accordance with the present invention, the computation of the control parameters is performed asynchronously from the associated data operation. For example, it can be performed in advance even while the data is still in the RLC layer 204. This enables the latency constraint on making the data available to be significantly relaxed and allows an additional slot of latency in the processing. The MAC layer 206 provides information needed for computation of the control parameters to the physical layer as early as possible, while the data is being processed in parallel. It should be noted that the ability to do so does not depend on the PDU processor 310 being utilized.

Figure 4:
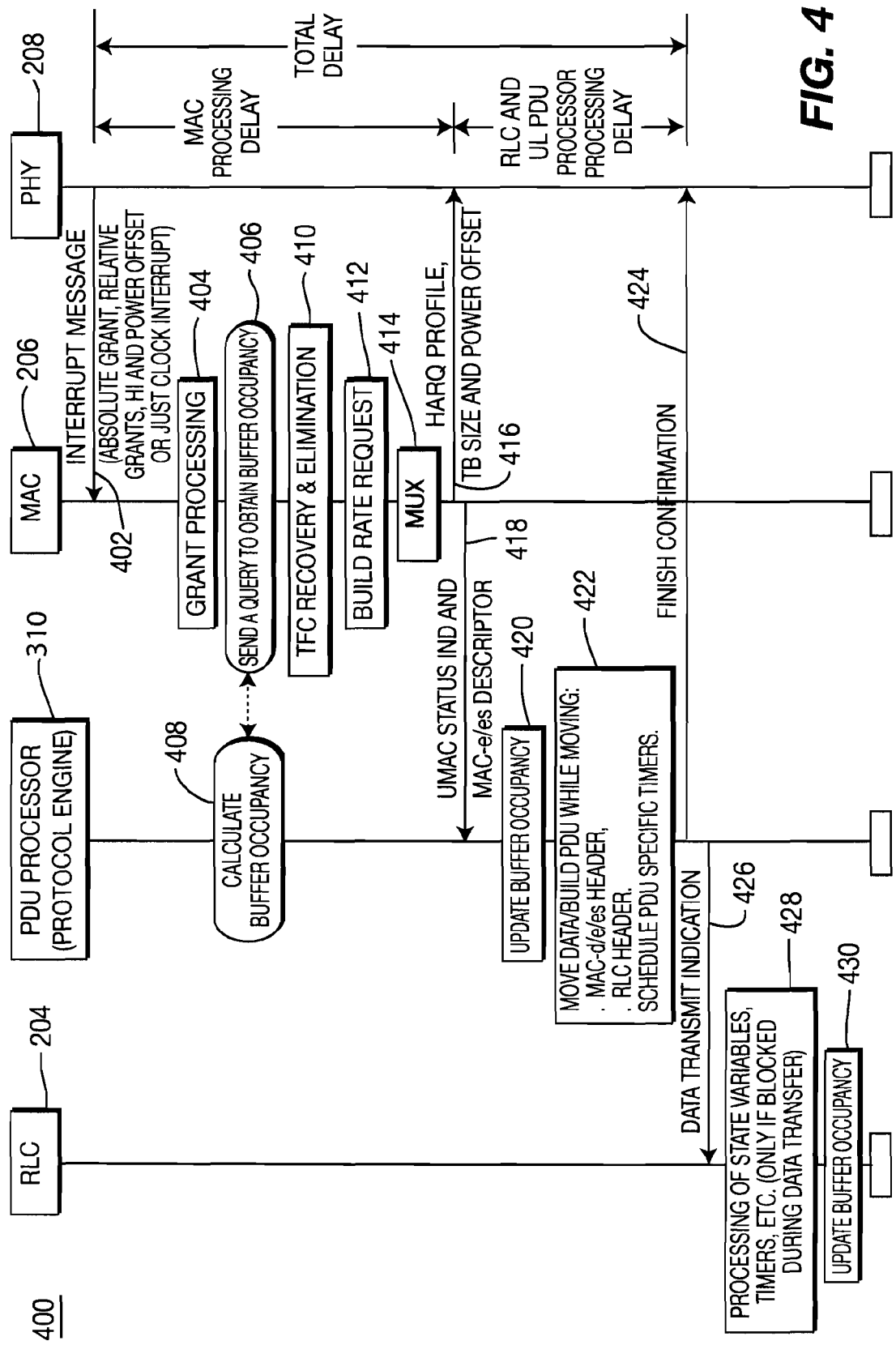
FIG. 4 is a signaling diagram of a process for efficient operation of an E-DCH in accordance with a first embodiment of the present invention.

FIG. 4 is a signaling diagram of a process 400 implemented in the WTRU 102 for efficient operation of an E-DCH in accordance with a first embodiment of the present invention. In accordance with the first embodiment, E-DCH operations are implemented with the PDU processor 310. MAC layer processing is triggered by an interrupt message, (or primitive), sent by the physical layer 208 (step 402). The MAC layer processing may be triggered at each transmission time interval (TTI) for which an H-ARQ process is available for transmission, each TTI that new scheduling grant information is received, or every E-DCH TTI.

The physical layer 208 generates the interrupt message when an H-ARQ process is available for an upcoming TTI. Availability of a particular H-ARQ process is determined when the physical layer 208 receives an ACK for a previous H-ARQ transmission via the H-ARQ process, when the maximum number of retransmissions for the H-ARQ process has reached so that the H-ARQ process is released, or when the H-ARQ process was not used in the previous TTI. The physical layer 208 may also generate the interrupt message when the WTRU 102 receives updated scheduling grant information from the Node-B 104. The interrupt message may be a TTI based clock interrupt.

The interrupt message contains several information elements including, but not limited to, 1) an absolute grant with indication if received with a primary or secondary enhanced uplink radio network temporary identity (E-RNTI); 2) a relative grant(s) from serving and non-serving cells; 3) an H-ARQ indicator (HI) of previous transmissions; 4) a current dedicated physical control channel (DPCCH) power; or 5) clock interrupt.

Upon being invoked by the physical layer 208, the MAC layer 206 performs several tasks. The MAC layer 206 performs grant processing in accordance with the updated scheduling grant information, if provided, including an absolute grant and relative grants to derive current scheduling grant and corresponding remaining transmit power for E-DCH transmission (step 404). The MAC layer 206 also obtains buffer occupancy (step 406). The buffer occupancy may be obtained using a function call to the PDU processor 310, as shown by steps 406 and 408, if the PDU processor 310 and the MAC layer 206 share a memory between them. At such point, any RLC asynchronized tasks, (such as timer processing, control PDUs processing, or the like), are blocked to maintain buffer occupancy consistency. The MAC layer 206 performs a transport format combination (TFC) recovery and elimination process to determine E-DCH TFCs that are allowed with the remaining transmit power for E-DCH (step 410). The MAC layer 206 may also generate a rate request to request a resource from the Node-B 104 (step 412). The MAC layer

206 may also perform a multiplexing procedure for multiplexing multiple MAC-d PDUs into MAC-es PDUs and one or multiple MAC-es PDUs into a single MAC-e PDU (step 414). The foregoing description of the MAC layer tasks of steps 404-414 may be performed in different order or simultaneously and not all the tasks may be necessary.

The MAC layer 206 then sends a message to the physical layer 208 to enable the physical layer 208 to calculate control parameters while the data is being processed by other entities, such as the MAC layer 206, the PDU processor 310 or the RLC layer 204 (step 416). The message includes an H-ARQ profile, a transport block (TB) size, a power offset, or the like. The H-ARQ profile indicates a power offset attributes and a maximum number of retransmissions for H-ARQ processes. By sending this message to the physical layer 208 before MAC-e processing is complete, the latency constraint can be significantly relaxed. The processing delay up to step 416 is the MAC layer processing delay and should be less than a certain delay limit, (e.g., 1.7 ms).

The MAC layer 206 then sends a message, (or a primitive), (i.e., UMAC status indicator and MAC-e/es descriptor), to request the PDU processor 310 to build a MAC-e PDU (step 418). The message, (or primitive), includes the number and size of required RLC PDUs for each logical channel and MAC-e/es descriptor(s) defining the multiplexing of the MAC-e/es PDU.

Upon receiving the message, (or a primitive), from the MAC layer 206, the PDU processor 310 updates buffer occupancy accordingly (step 420). At such time, the blocking of RLC asynchronized task, (such as timer processing, control PDUs processing, or the like), is removed. The PDU processor 310 then moves the data to the physical layer 208 or, alternatively, builds a MAC-e PDU while moving the data from the stack memory 306 to the L1 memory 308 (step 422). The PDU processor 310 builds RLC PDUs including the RLC headers according to the PDU number and size requested by the MAC layer 206. The PDU processor 310 also builds a MAC-e header and a MAC-es header and corresponding MAC-es PDUs and a MAC-e PDU based on the MAC-e/es descriptor. The PDU processor 310 also sets up RLC PDU specific timers and state variables.

The PDU processor 310 may send a finish confirmation message, (or primitive), to the physical layer 208 (step 424). Alternatively, this may be implicitly known to the physical layer 208 by the reception of the MAC-e PDU. The PDU processor 310 then sends a data transmit indication message, (or primitive), to the RLC layer 204 (step 426). Upon receiving this transmit indication message, the RLC layer 204 may process state variables, timers, or the like, if blocked during the data transfer (step 428). The RLC layer 204 then updates buffer occupancy accordingly (step 430).

The delay between the UMAC status indicator at step 418 and the MAC-e PDU generation at step 424 is the RLC layer and PDU processor processing delay. The sum of the RLC layer and PDU processor processing delay and the MAC processing delay should be limited to a reasonable delay limit, (e.g., 2.37 ms). In order to avoid parallel processing, the maximum delay limit may be reduced to a period less than 2 ms. Otherwise, parallel processing may be allowed.

Figure 5:
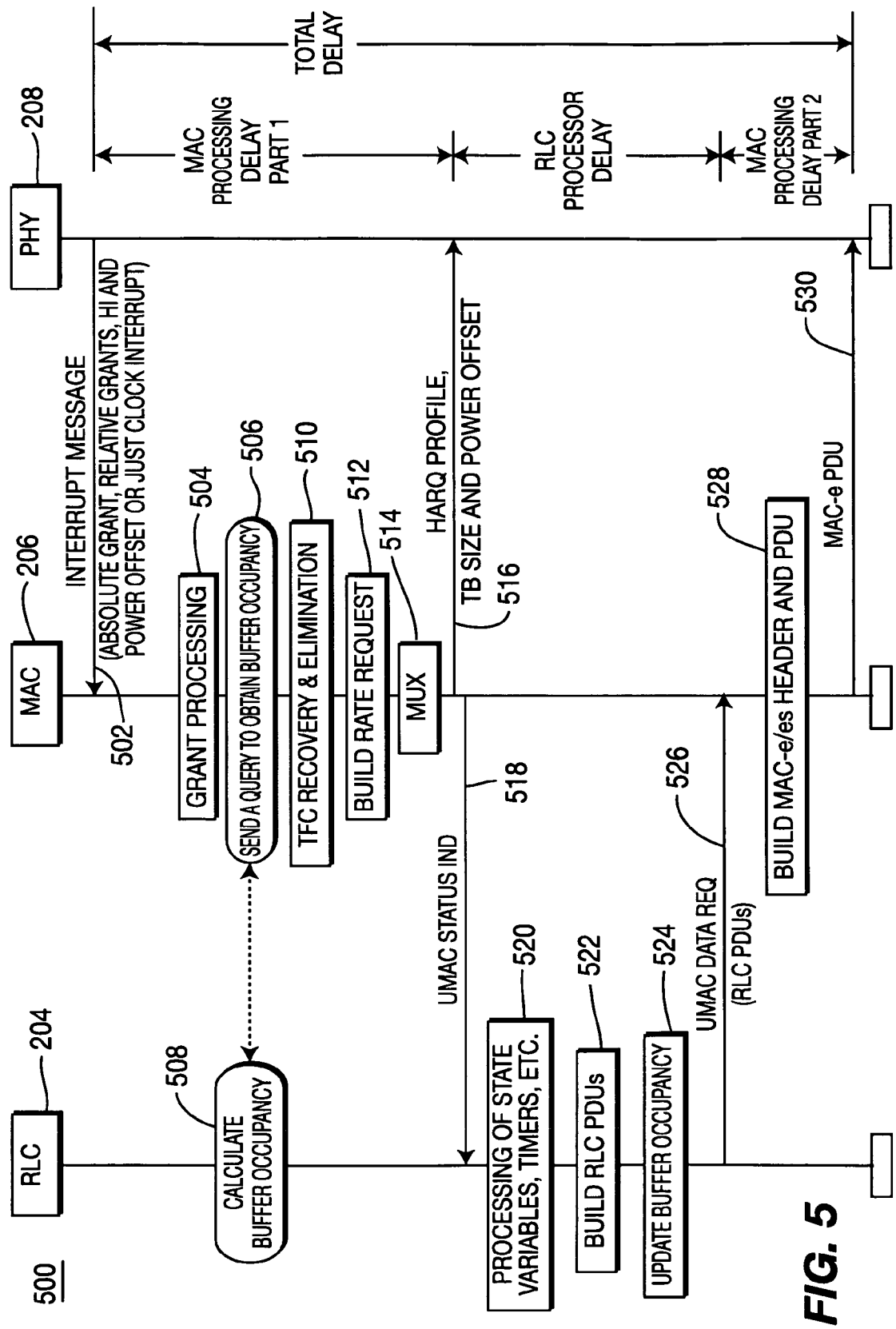
FIG. 5 is a signaling diagram of a process for efficient operation of an E-DCH in accordance with a second embodiment of the present invention.

FIG. 5 is a signaling diagram of a process 500 implemented in the WTRU 102 for efficient operation of an E-DCH in accordance with a second embodiment of the present invention. In accordance with the second embodiment, the present invention is implemented without a PDU processor. The MAC layer 206 preferably runs at least each TTI for which an H-ARQ process is available for transmission and/or for each TTI new scheduling grant information is received. Alternatively, the MAC layer 206 may run at every E-DCH TTI. MAC layer processing is triggered by an interrupt message, (or primitive), sent by the physical layer 208 (step 502). The interrupt from the physical layer 208 may be based on one or more of the events enumerated hereinbefore with respect to the first embodiment.

Upon being invoked by the physical layer 208, the MAC layer 206 performs several tasks. The MAC layer 206 performs grant processing in accordance with updated scheduling grants, if provided, including absolute grants and relative grants to derive current scheduling grant and corresponding remaining transmit power for E-DCH transmission (step 504). The MAC layer 206 also obtains buffer occupancy information by sending a function call to the RLC layer 204 (step 506). The RLC layer 204 calculates buffer occupancy and returns it to the MAC layer 206 (step 508). The MAC layer 206 performs a TFC recovery and elimination process to determine E-DCH TFCs that are allowed with the remaining transmit power for E-DCH (step 510). The MAC layer 206 may also generate a rate request to request resources from the Node-B 104 (step 512). The MAC layer 206 performs a multiplexing procedure for multiplexing multiple MAC-d PDUs into MAC-es PDUs and one or multiple MAC-es PDUs into a single MAC-e PDU (step 514). The foregoing description of the MAC layer tasks at steps 504-514 may be performed in different order or simultaneously and not all the tasks may be necessary.

The MAC layer 206 then sends a message including an H-ARQ profile, a TB size, a power offset, or the like to the physical layer 208 (step 516). By sending this message to the physical layer 208 before MAC-e processing is complete, the latency constraint can be significantly relaxed. The processing delay up to step 516 is part of the overall MAC processing delay, denoted as "MAC processing delay part 1", and should be less than a certain delay limit, (e.g., 1.7 ms).

The MAC layer 206 requests data from the RLC layer 204 by sending a UMAC status indicator (step 518). With the UMAC status indicator, the RLC layer 204 is notified about the size of required RLC PDUs. Upon receiving the UMAC status indicator from the MAC layer 206, the RLC layer 204 processes state variables, timers, or the like (step 520). The RLC layer 204 builds RLC PDUs including RLC headers according to the PDU number and size requested by the MAC layer 206 (step 522). The RLC layer 204 then updates buffer occupancy accordingly (step 524).

The RLC layer 204 then sends the RLC PDUs to the MAC layer 206 (step 526). The delay between the message at step 516 and the message at step 526 is the RLC processing delay. Upon receiving the RLC PDUs, the MAC layer 206 builds MAC-es headers and a MAC-e header and builds corresponding MAC-es PDUs and MAC-e PDU (step 528). The MAC layer 206 then sends the MAC-e PDU to the physical layer 208 (step 530). The delay between step 526 and step 530 is part of the overall MAC processing delay as denoted "MAC processing delay part 2."

The sum of the RLC processing delay and MAC processing delay should be limited to a reasonable delay limit, (e.g., 2.37 ms). In order to avoid parallel processing, the maximum delay limit may be reduced to a period less than 2 ms. Otherwise, a parallel processing may be allowed.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of transmitting enhanced dedicated channel (E-DCH) data, the method comprising:
sending an interrupt message by a physical layer to a medium access control (MAC) layer;
initiating MAC layer processing by the MAC layer for the E-DCH transmission of the data during a first time period after receiving the interrupt message;
sending a first message to the physical layer by the MAC layer, the first message including information that enables the physical layer to compute control parameters for the E-DCH transmission of the data; and
the physical layer computing the control parameters for the E-DCH transmission of the data during a second time period while the data is being processed by an entity other than the physical layer, the second time period overlapping the first time period.

2. The method of claim 1, wherein the first message sent to the physical layer for calculating the control parameters includes at least one of: a hybrid automatic repeat request profile, a transport block size, or a transmit power offset for the E-DCH.

3. The method of claim 1, wherein the physical layer sends the interrupt message to the MAC layer at any one of: each transmission time interval (TTI) for which a hybrid automatic repeat request process is available for transmission, each TTI that new scheduling grant information is received, or every TTI.

4. The method of claim 1, further comprising:
the MAC layer sending a second message to a protocol data unit (PDU) processor to generate a MAC-e PDU; and
the PDU processor generating the MAC-e PDU based on the second message and sending the MAC-e PDU to the physical layer for transmission via the E-DCH.

5. The method of claim 4, wherein a total processing delay from the time that the interrupt message is sent to the time that the MAC-e PDU is generated is limited to two milliseconds.

6. The method of claim 1, wherein the interrupt message includes any one of:
an absolute grant with indication on a condition that it was received with a primary or secondary enhanced uplink radio network temporary identity;
relative grants from serving or non-serving cells;
a hybrid automatic repeat request indicator of previous transmissions;
a current dedicated physical control channel power; or
a clock interrupt.

7. A method of transmitting enhanced dedicated channel (E-DCH) data, the method comprising:
sending an interrupt message by a physical layer to a medium access control (MAC) layer;
initiating MAC layer processing by the MAC layer for the E-DCH transmission of the data during a first time period after receiving the interrupt message;
sending a first message to the physical layer by the MAC layer, the first message including information that enables the physical layer to compute control parameters for the E-DCH transmission of the data;
the physical layer computing the control parameters for the E-DCH transmission of the data during a second time period while the data is being processed by an entity other than the physical layer, the second time period overlapping the first time period;
sending a second message by the MAC layer to a radio link control (RLC) layer;
generating an RLC protocol data unit (PDU) based on the second message by the RLC layer and sending the RLC PDU to the MAC layer; and
generating a MAC-e PDU by the MAC layer and sending the MAC-e PDU to the physical layer for transmission via the E-DCH.

8. The method of claim 7, wherein the first message sent to the physical layer for calculating the control parameters includes at least one of: a hybrid automatic repeat request profile, a transport block size, or a transmit power offset for the E-DCH.

9. The method of claim 7, wherein the physical layer sends the interrupt message to the MAC layer at any one of: each transmission time interval (TTI) for which a hybrid automatic repeat request process is available for transmission, each TTI that new scheduling grant information is received, or every E-DCH TTI.

10. The method of claim 7, wherein a total processing delay from the time that the interrupt message is sent to the time that the MAC-e PDU is generated is limited to two milliseconds.

11. A wireless transmit/receive unit (WTRU) for transmitting enhanced dedicated channel (E-DCH) data, the WTRU comprising:
a physical layer processor configured to send an interrupt message to a medium access control (MAC) layer;
the MAC layer configured to:
initiate a MAC layer processing for the E-DCH transmission of the data during a first time period after receiving the interrupt message; and
send a first message to the physical layer processor, the first message including information that enables the physical layer processor to compute control parameters for the E-DCH transmission of the data; and
the physical layer processor being further configured to compute the control parameters for the E-DCH transmission of the data during a second time period while the data is being processed by an entity other than the physical layer processor, the second time period overlapping the first time period.

12. The WTRU of claim 11, wherein the first message sent to the physical layer processor for calculating the control parameters includes at least one of: a hybrid automatic repeat request profile, a transport block size, or a transmit power offset for the E-DCH.

13. The WTRU of claim 11, wherein the physical layer processor is configured to send the interrupt message to the MAC layer at any one of: each transmission time interval (TTI) for which a hybrid automatic repeat request process is available for transmission, each TTI that new scheduling grant information is received, or every E-DCH TTI.

14. The WTRU of claim 11, wherein:
the MAC layer is further configured to send a second message to a protocol data unit (PDU) processor for generating a MAC-e PDU; and
the PDU processor is configured to:
generate the MAC-e PDU based on the second message received from the MAC layer; and
send the MAC-e PDU to the physical layer processor for transmission via the E-DCH.

15. The WTRU of claim 11, wherein:
the MAC layer is further configured to send a second message to a radio link control (RLC) layer to generate an RLC protocol data unit (PDU);
the RLC layer is configured to:
generate the RLC PDU based on the second message received from the MAC layer; and
send the RLC PDU to the MAC layer; and
the MAC layer is further configured to:
generate a MAC-e PDU based on the RLC PDU generated by the RLC layer; and
send the MAC-e PDU to the physical layer processor for transmission via the E-DCH.

* * * * *